United States Patent
Lin et al.

(10) Patent No.: US 11,675,337 B2
(45) Date of Patent: Jun. 13, 2023

(54) SYSTEM AND METHOD FOR ACCELERATION ADJUSTMENT OF MACHINE TOOL AT RAPID TRAVERSE

(71) Applicant: Industrial Technology Research Institute, Hsinchu (TW)

(72) Inventors: Jheng-Jie Lin, Taichung (TW); Kuo-Hua Chou, Hsinchu County (TW); Chien-Chih Liao, Taichung (TW); Jen-Ji Wang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/227,666

(22) Filed: Apr. 12, 2021

(65) Prior Publication Data

US 2022/0214664 A1 Jul. 7, 2022

(30) Foreign Application Priority Data

Jan. 7, 2021 (TW) ................................ 110100534

(51) Int. Cl.
*G05B 19/416* (2006.01)
*B23Q 17/09* (2006.01)

(52) U.S. Cl.
CPC ..... *G05B 19/4163* (2013.01); *B23Q 17/0961* (2013.01)

(58) Field of Classification Search
CPC ...... G05B 19/4163; G05B 2219/49054; G05B 19/416; G05B 2219/36521; B23Q 17/0961
See application file for complete search history.

(56) References Cited

U.S. PATENT DOCUMENTS

| | | | |
|---|---|---|---|
| 5,256,951 | A | 10/1993 | Nashiki et al. |
| 7,902,780 | B2 | 3/2011 | Okita et al. |

(Continued)

FOREIGN PATENT DOCUMENTS

| | | |
|---|---|---|
| CN | 101231517 A | 7/2008 |
| CN | 101581927 B | 10/2012 |

(Continued)

OTHER PUBLICATIONS

TW OA dated Sep. 30, 2021.

*Primary Examiner* — Kenneth M Lo
*Assistant Examiner* — Mohammed Shafayet
(74) *Attorney, Agent, or Firm* — WPAT, P.C (57) ABSTRACT

A system for acceleration adjustment of machine tool at rapid traverse includes a signal measurement module, a signal judgment module and an acceleration optimization module. The machine tool has a servo motor and a working platform. The signal measurement module measures signals while the servo motor drives the working platform from a first specific position to a second specific position, or from the second specific position back to the first specific position. The signal judgment module judges whether the actual maximum current value of the motor is equal to the manufacturer's specification according to the signals; and if negative, the acceleration optimization module calculates and optimizes an axial acceleration till an optimal value is achieved. Then, a curve smoothing time of the optimal acceleration is calculated and optimized by the acceleration optimization module. In addition, a method for acceleration adjustment of machine tool at rapid traverse is provided.

2 Claims, 5 Drawing Sheets

(56) References Cited

U.S. PATENT DOCUMENTS

| | | | |
|---|---|---|---|
| 10,698,383 B1 | 6/2020 | Lin et al. | |
| 2006/0116786 A1* | 6/2006 | Iwashita | G05B 19/416 |
| | | | 701/1 |
| 2013/0238101 A1 | 9/2013 | Kuramoto et al. | |
| 2015/0352679 A1* | 12/2015 | Yamamoto | B23Q 17/007 |
| | | | 73/865.8 |
| 2018/0010986 A1 | 1/2018 | Matsuo et al. | |
| 2019/0033821 A1* | 1/2019 | Kamiya | G05B 19/404 |
| 2020/0070295 A1* | 3/2020 | Uenishi | B23Q 17/12 |
| 2021/0034040 A1* | 2/2021 | Yamamoto | B23Q 17/0976 |

FOREIGN PATENT DOCUMENTS

| | | |
|---|---|---|
| CN | 105071731 A | 11/2015 |
| CN | 105814503 A | 7/2016 |
| TW | I336821 | 2/2011 |
| TW | 201222175 | 6/2012 |
| TW | I400591 B | 7/2013 |
| TW | I435517 B | 4/2014 |
| TW | 202011684 | 3/2020 |
| TW | 202026095 A | 7/2020 |

* cited by examiner

SYSTEM AND METHOD FOR ACCELERATION ADJUSTMENT OF MACHINE TOOL AT RAPID TRAVERSE

CROSS REFERENCE TO RELATED APPLICATION

This application claims the benefits of Taiwan application Serial No. 110100534, filed on Jan. 7, 2021, the disclosures of which are incorporated by references herein in its entirety.

TECHNICAL FIELD

The present disclosure relates in general to a method for acceleration adjustment of machine tool, and more particularly to a method and system for acceleration adjustment of machine tool in a non-machining traverse stroke.

BACKGROUND

Currently, one main functional demand for machine tool is the ability to perform machining at high speeds and high precision. With the rapid development of controller, one way for the machine tool to achieve the aforesaid goals is to optimize parameters of traverse acceleration for the working platform in a non-machining stroke. For most domestic manufacturers of machine tool, controllers of FANUC, HEIDENHAIN or SIEMENS are usually applied; obviously, all foreign brands. It is inevitable that the domestic maintenance or service personnel would have a problem in fully understanding these foreign controllers, and thus a conservative manner is usually held by these personnel while in adjusting parameters of the controllers, but an optimal state of the machine tool is then hard to be achieved. For example, by adjusting a set of acceleration parameters for a non-machining axial stroke, though such an adjustment may serve various types of machine tool to function well, yet the optimal operation state for the machine tool to achieve the best kinematic efficiency would be barely obtained. Further, if a single traverse acceleration parameter is set too large to control vibrations of the machine structure, then surface ripples on the workpiece would be inevitable. Thus, the issue how to obtain an optimal set of parameters for the axial traverse acceleration would be definitely urgent to the service personnel in this art.

SUMMARY

In this disclosure, a system and method for acceleration adjustment of machine tool at rapid traverse that traverse acceleration of the machine tool can adjusted according to structural vibrations of machine and the maximum current value of motor. Since different parameter setting for controllers may be required to serve different machine tools, thus reduction in operation efficiency and equipment performance would be expected. However, by providing the system and method of this disclosure to replace the conventional manual adjustment at the setting, the entire operation efficiency of the machine tool can be significantly improved.

In one embodiment of this disclosure, a system for acceleration adjustment of machine tool at rapid traverse is applied to the machine tool connected with a servo motor and a working platform. The system includes a signal measurement module, a signal judgment module and an acceleration optimization module. The signal measurement module is configured to capture a plurality of signals generated while the servo motor of the machine tool drives the working platform from a first specific position to a second specific position, or from the second specific position back to the first specific position. The signal judgment module is configured to evaluate the plurality of signals to determine whether or not an actual maximum current value of the servo motor is less than a specification value of the servo motor. The acceleration optimization module is configured to evaluate a judgment of the signal judgment module to adjust and determine a traverse acceleration for the working platform.

In another embodiment of this disclosure, a method for acceleration adjustment of machine tool at rapid traverse is applied to the machine tool connected with a servo motor and a working platform. This method includes: a step of applying a signal measurement module to capture a plurality of signals generated while the servo motor of the machine tool drives the working platform from a first specific position to a second specific position, or from the second specific position back to the first specific position; a step of applying a signal judgment module to evaluate the plurality of signals to determine whether or not an actual maximum current value of the servo motor is less than a specification value of the servo motor; and, a step of applying an acceleration optimization module to evaluate a judgment of the signal judgment module to adjust and determine a traverse acceleration for the working platform.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In this disclosure, a system and method for acceleration adjustment of machine tool at rapid traverse are provided mainly for adjusting an optimal traverse acceleration and an associated curve smoothing time of a working platform of machine tool. In the following description, the parameter "optimal traverse acceleration" is directed to the maximum acceleration of the working platform in a single axial direction within a non-machining stroke, and the other parameter "curve smoothing time" is directed to the time for the working platform to accelerate from a zero value to the optimal traverse acceleration, or reversely to decelerate from the optimal traverse acceleration to the zero value, in a manner of smoothly moving the working platform so as to reduce possible vibrations at the working platform. These two parameters would be optimized firstly, and then provided for the user to proceed the setting of the traverse stroke. Thereupon, the performance of the servo motor can be utterly implemented, the moving speed of the working platform can be increased so that the moving time can be shortened without causing excessive position error or shaking. In this disclosure, the working platform can be a movable machine, bed or platform that carries a workpiece or tooling of the machine tool.

Figure 1:
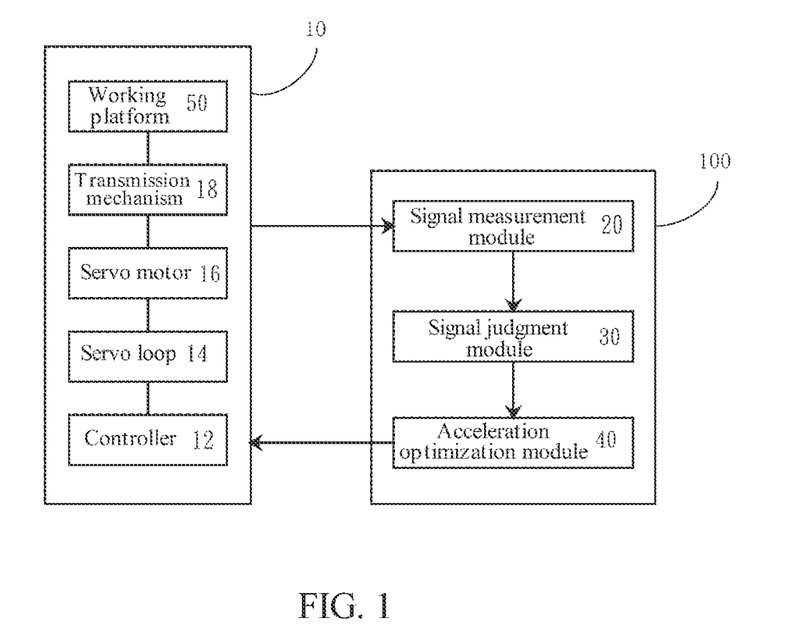
FIG. 1 is a schematic block view of an embodiment of the system for acceleration adjustment of machine tool at rapid traverse in accordance with this disclosure.

FIG. 1 is a schematic block view of an embodiment of the system for acceleration adjustment of machine tool at rapid traverse in accordance with this disclosure. As shown, the system for acceleration adjustment of machine tool at rapid traverse 100 mainly includes a signal judgment module 30, an acceleration optimization module 40, and an optional signal measurement module 20. The system 100 is connected with the machine tool 10. Each of the signal judgment module 30 and the acceleration optimization module 40 can be a computer capable of calculation, storage and input/output functions.

The machine tool 10 mainly includes a controller 12, a servo loop 14, a servo motor 16, a transmission mechanism 18 and a working platform 50. The controller 12 controls the servo loop 14 to run the servo motor 16, and then the transmission mechanism 18 to displace the working platform 50 axially. The signal measurement module 20, connected with the machine tool 10, is configured to capture a current value of the servo motor 16 and signals related to the working platform 50, such as position signals, velocity signals, acceleration signals and vibration signals. Hence, the signal measurement module 20 may include a galvanometer, an accelerometer, an optical ruler and the like equipment. The signal judgment module 30 is configured to receive the aforesaid signals, and further thereby to determine machine structure vibrations and actual motor currents of the machine tool 10. The acceleration optimization module 40 is configured to adjust the optimal traverse acceleration and curve smoothing time for the working platform 50.

Figure 2:
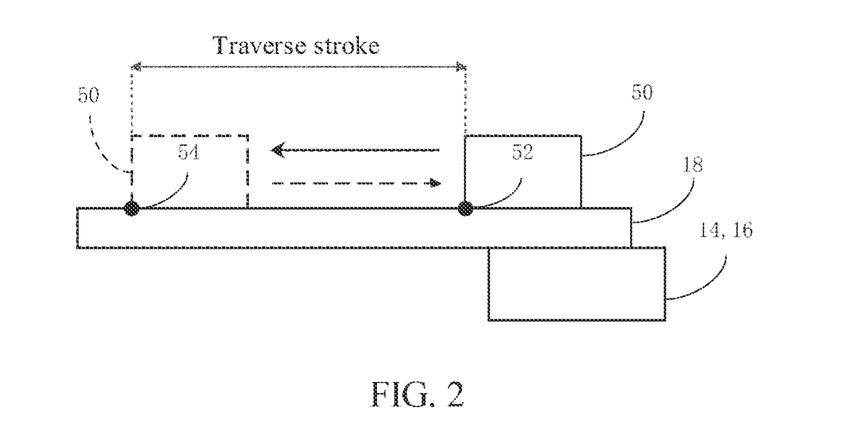
FIG. 2 demonstrates schematically that a working platform moves back and forth between two specific positions.

FIG. 2 demonstrates schematically that a working platform moves back and forth between two specific positions.

As shown, while the servo motor 16 controls, via the transmission mechanism 18, the working platform 50 to move from a first specific position 52 to a second specific position 54, the signal measurement module 20 would measure and collect synchronously all the signals related to the moving, or all the signals related to the reverse moving from the second specific position 54 back to the first specific position 52, and then an analysis is carried out. Obviously, the aforesaid two moving do have the same travel distance, and the related signals are roughly the same. This travel distance is defined as a traverse stroke, and no machining is performed during the traverse stroke.

Figure 3:
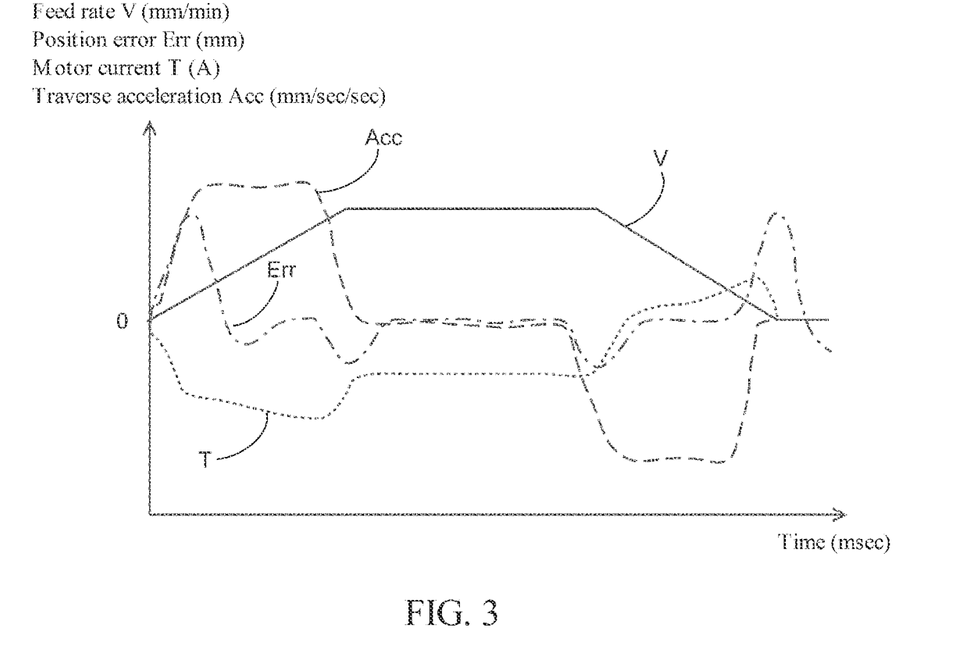
FIG. 3 shows schematically variations of different electric signals with respect to time in accordance with this disclosure.

With respect to the time, while the working platform 50 travels from the first specific position 52 to the second specific position 54, all variations of the aforesaid signals related to the working platform 50, including signals of the feed rate (V), the position error (Err), the traverse acceleration (Acc) and the motor current (T) of the servo motor 16, are all recorded and shown schematically in FIG. 3. The position error (Err) is related to the machine vibration signal of the machine tool 10. At the moment that the feed rate (V) of the working platform 50 meets an abrupt change such as a deceleration or acceleration, vibrations with larger amplitudes would be suddenly induced. Then, the severe fluctuations would be gradually died down and thus convergent. Simultaneously, the actual maximum current values of the motor are also presented in FIG. 3. In this disclosure, times for the working platform 50 to move back and forth between the first specific position 52 and the second specific position 54 are not limited.

Figure 4:
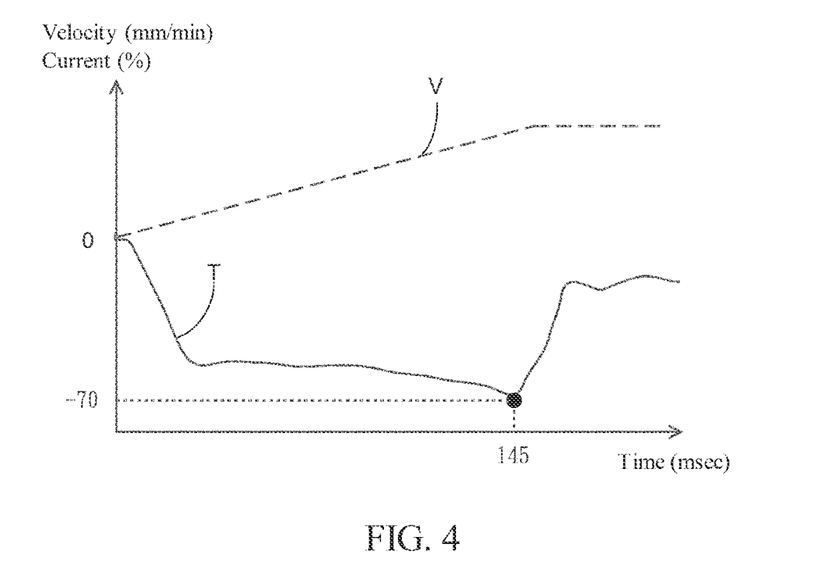
FIG. 4 shows schematically variations of feed rate and corresponding actual current values of motor in accordance with this disclosure.
Figure 5:
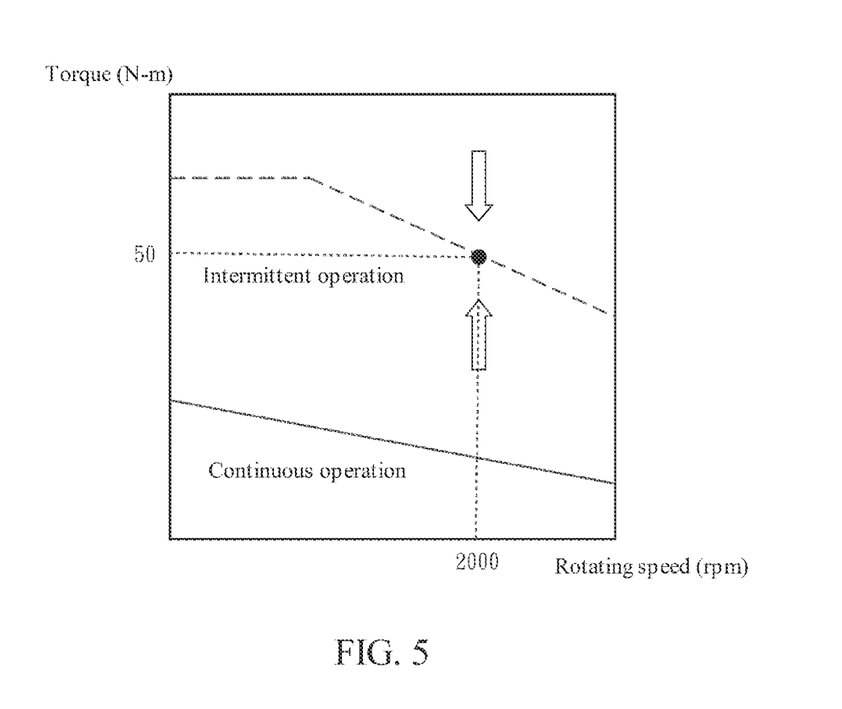
FIG. 5 shows schematically operations of a typical manufacturer-made motor at traverse acceleration.

Each of the aforesaid signals would be forward to the signal judgment module 30 by the signal measurement module 20, so that the signal judgment module 30 can determine correspondingly the machine structure vibrations and the maximum current value of the motor. Thereupon, it can be determined whether or not the actual maximum current value of the motor is equal to the manufacturer's specification, which defines the safe value or upper limit of the maximum instant current value of the motor. However, it shall be noted that, for safety, the practical current value of the motor shall be at least less than the manufacturer's specification. The same criterion would prevail in all the following description. At the 145 msec of FIG. 4 (marked by a block spot), the actual maximum current value (T) of the motor current (T) equal to about 70% appears. Namely, at this moment, the servo motor 16 is operated by a current of about 70% of the manufacturer's specification. FIG. 5 demonstrates the manufacturer's specification of the motor. As shown, the horizontal axis is the rotating speed (rpm) of the motor, while the vertical axis is the torque (N–m) of the motor. After the actual maximum current value of the motor can be determined, the acceleration optimization module 40 would adjust the traverse acceleration (Acc) of the working platform 50 as follows.

The higher the traverse acceleration (Acc) of the working platform 50 is (i.e., the start-up load of the servo motor 16 is increased), the bigger the actual current value (T) would be. Otherwise, the lower the traverse acceleration (Acc) of the working platform 50 is, the smaller the actual current value (T) would be. Namely, the actual current value of the motor is proportional to the traverse acceleration, and the traverse acceleration is further proportional to the output torque of the motor. Following is an example, but not an example to limit the scope of this disclosure.

$$Acc_2 = Acc_1 \times \frac{T_{goal}}{T_{max}} \quad (1)$$

In equation (1), $Acc_1$ is the traverse acceleration at the initial or current stage, $Acc_2$ is the traverse acceleration at the next stage, $T_{goal}$ the motor specification value, and $T_{max}$ is the actual maximum current value of the motor. In equation (1), the ratio of the motor specification value to the actual maximum current value of the servo motor 16 is applied to gradually adjust the traverse acceleration of the current stage till the torque value is equal to the upper limit of the torque corresponding to the motor specification value ($T_{goal}$). Then, at this moment, the traverse acceleration ($Acc_2$) of the next stage would be the optimal traverse acceleration (Acc). As shown in FIG. 5, for example, at the rotating speed of 2000 rpm, the current value corresponding to the optimal traverse acceleration (Acc) is suggested not to exceed the current value corresponding to the maximum torque (50N–m) of the manufacturer's specification listed in the motor performance table. The foregoing algorithm for determining the optimal traverse acceleration (Acc) is performed by the acceleration optimization module 40.

Except for equation (1), according to this disclosure, when the actual maximum current value of the motor ($T_{max}$) is larger or less than the motor specification value ($T_{goal}$) as shown in FIG. 5, the traverse acceleration ($Acc_1$) would be modified by adding or subtracting a difference $\Delta A$, till the actual maximum current value of the motor ($T_{max}$) is equal to the motor specification value ($T_{goal}$). At this moment, the traverse acceleration ($Acc_2$) of the next stage would be the optimal traverse acceleration (Acc). That is, the adjustment made by the acceleration optimization module 40 can exploit fully the utmost performance of the servo motor 16, and thus the working platform 50 can move at the maximum acceleration without damaging the motor. In this disclosure, the difference $\Delta A$ is not limited to any specific constant.

Figure 6:
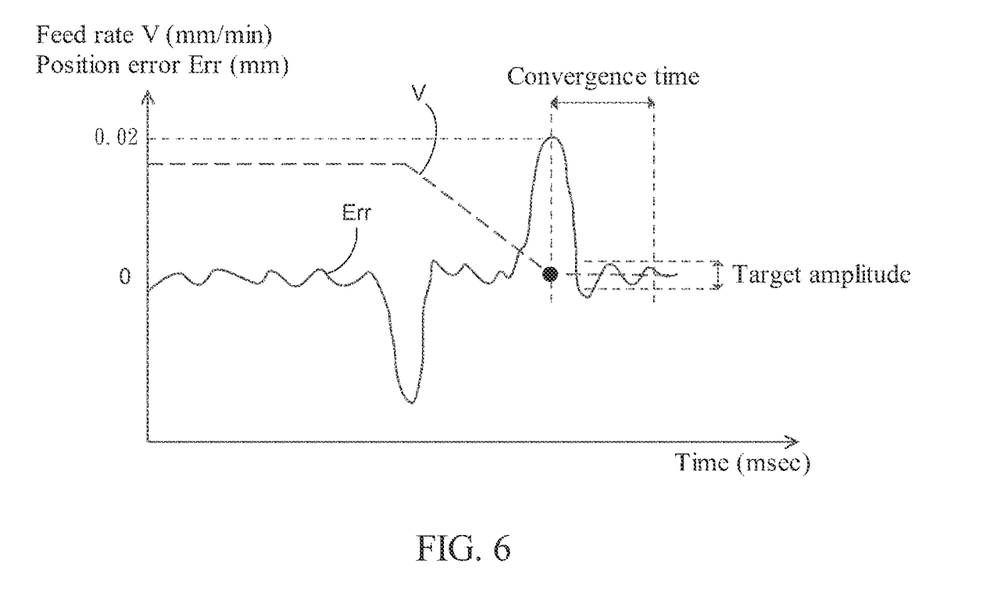
FIG. 6 shows schematically variations of feed rate and corresponding position errors in accordance with this disclosure.

After one optimal traverse acceleration (Acc) is determined, then it is judged if, when the working platform 50 is moved at the optimal traverse acceleration (Acc), the machine vibration signal or the position error can affect the working platform 50 or even the machine tool 10, in which the vibration signal can be obtained from a linear optical ruler, a motor encoder, a tool tip position or an accelerometer. The signal measurement module 20 can capture the signal of the position error (Err) while the working platform 50 is moved from the first specific position 52 to the second specific position 54, in which the signal of the position error can be deduced from the variation of amplitude with respect to the time. In FIG. 6, it is shown that, at the moment the feed rate (V) of the working platform 50 changes due to deceleration or a sudden stop, the maximum position error (Err) would occur, and then the oscillation amplitude will be gradually died down and convergent. For example, at the block spot in FIG. 6, the maximum position error (Err) is about 0.02 mm, and this amplitude is gradually died down and convergent. The signal judgment module 30 is configured to determine whether or not, after the working platform 50 is stopped, the position error or oscillation amplitude of the working platform 50 of the machine tool 10 is equal to the target amplitude preset by the user, or falls within a target region. According to this disclosure, any of the target amplitude and the convergence time can be set by the user.

Figure 7:
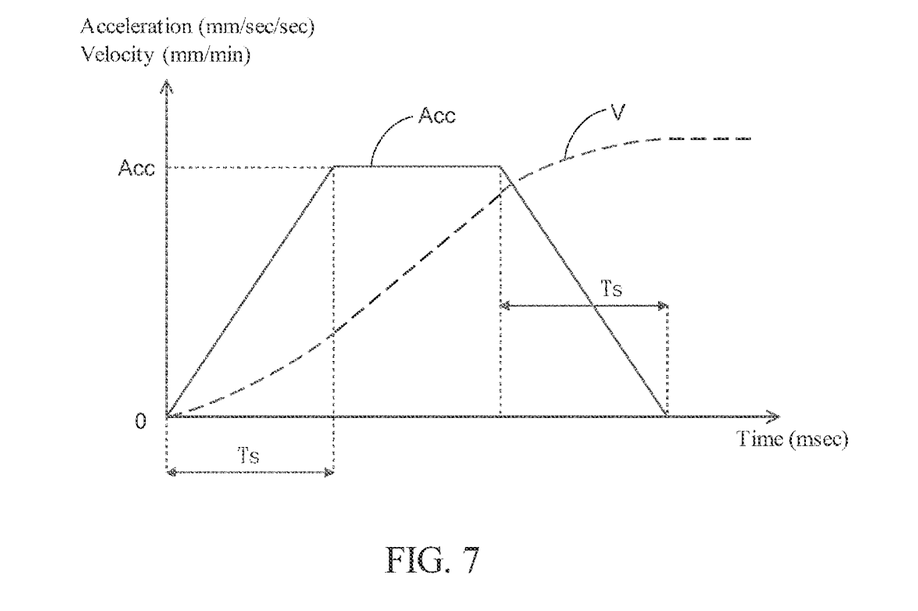
FIG. 7 shows schematically variations of curve smoothing time and corresponding traverse accelerations in accordance with this disclosure.

Referring to FIG. 7, variations of the curve smoothing time and corresponding traverse accelerations in accordance with this disclosure are shown schematically. For example, as the feed rate (V) of the working platform 50 is raised to a constant speed from a zero value or decreased to the zero value from the constant speed, and after the optimal traverse acceleration (Acc) of the working platform 50 is determined, then, if the curve smoothing time (Ts) is set longer, the amplitude of the position error (Err) would be shorter. On the other hand, if the curve smoothing time (Ts) is set shorter, then the amplitude of the position error (Err) would be longer. Namely, it implies that the curve smoothing time is reversely proportional to the position error. Following is an example, but not an example to limit the scope of this disclosure.

$$T_{s2} = T_{s1} \times \frac{Amp_{max}}{Amp_{goal}} \quad (2)$$

In equation (2), $Ts_1$ is the curve smoothing time at the initial or current stage, $Ts_2$ is the curve smoothing time at the next stage, $Amp_{max}$ is the actual maximum amplitude of the machine, and $Amp_{goal}$ is the target amplitude of the machine. When the actual maximum amplitude ($Amp_{max}$) of the machine is measured to be equal to the target amplitude ($Amp_{goal}$) of the machine, then the curve smoothing time (Ts2) of the next stage is the optimal curve smoothing time (Ts). In addition, when the actual maximum amplitude ($Amp_{max}$) of the machine is measured to be larger than the target amplitude ($Amp_{goal}$) of the machine, then the curve smoothing time ($Ts_2$) of the next stage needs to be elongated. Thereupon, the actual maximum amplitude ($Amp_{max}$) of the machine can be reduced. On the other hand, when the actual maximum amplitude ($Amp_{max}$) of the machine is measured to be shorter than the target amplitude ($Amp_{goal}$) of the machine, then the curve smoothing time ($Ts_2$) of the next stage needs to be reduced till the target amplitude ($Amp_{goal}$) is reached. Then, the acceleration optimization module 40 can complete the adjustment of the curve smoothing time (Ts). Except for equation (2), in this disclosure, the adjustment of the curve smoothing time ($Ts_2$) in the next stage can be also adjusted by adding or subtracting a difference $\Delta A$, and this difference $\Delta A$ is not limited to any specific constant.

Figure 8:
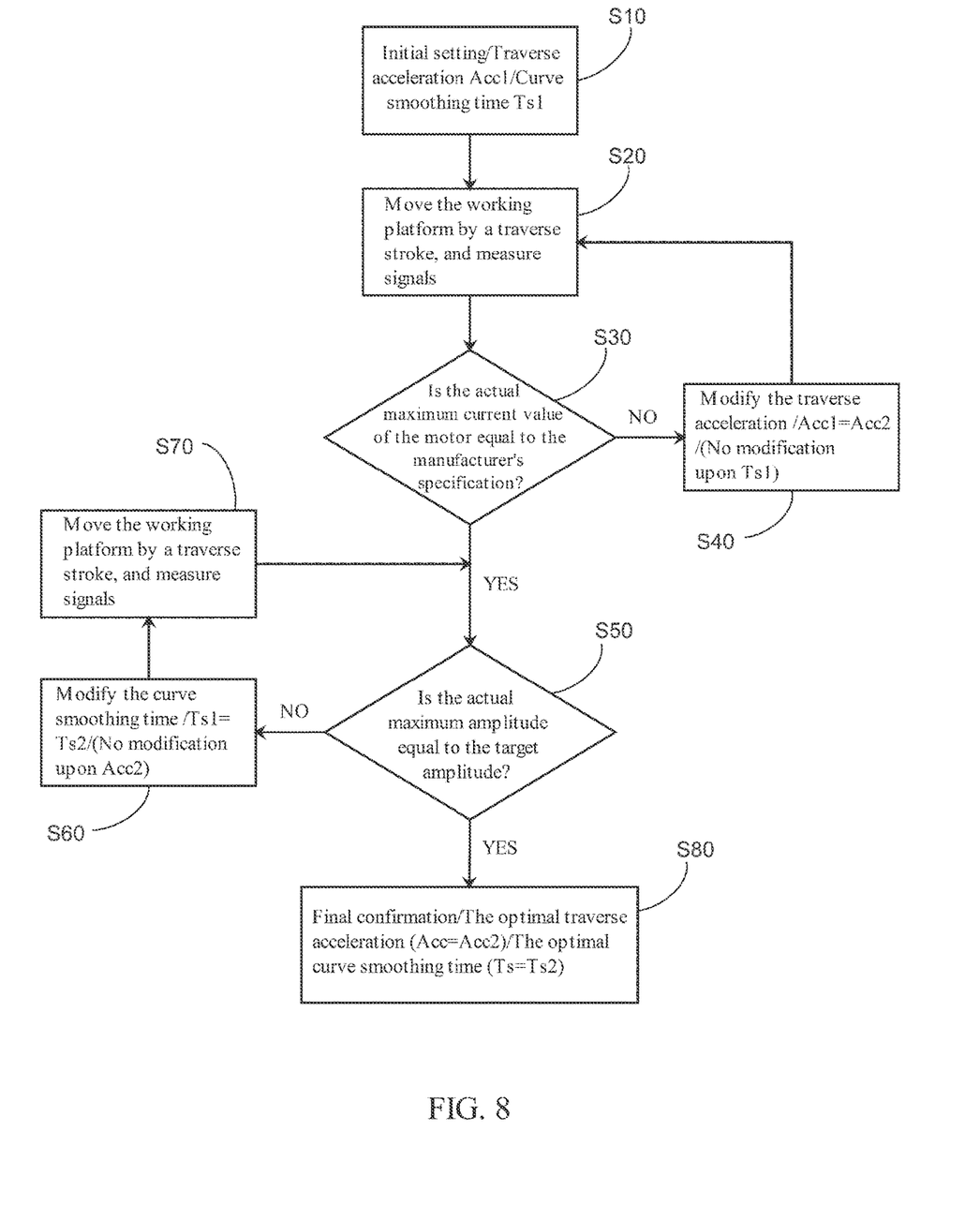
FIG. 8 is a flowchart of an embodiment of the method for acceleration adjustment of machine tool at rapid traverse in accordance with this disclosure.

FIG. 8 is a flowchart of an embodiment of the method for acceleration adjustment of machine tool at rapid traverse in accordance with this disclosure. The method for acceleration adjustment of machine tool at rapid traverse provided by this disclosure is applicable to the machine tool 10 connected with the servo motor 16 and the working platform 50, and is carried out through the system for acceleration adjustment of machine tool at rapid traverse 100. Firstly, initial setting is performed, or follow the manufacturer's specification to set up a group of driving parameters for the working platform 50, such as the traverse acceleration ($Acc_1$) and the curve smoothing time ($Ts_1$) as shown in Step S10 of FIG. 8. Then, based on these driving parameters, the working platform 50 is moved to complete a traverse stroke, for example, from the first specific position 52 to the second specific position 54. During the traverse stroke, the signal measurement module 20 measures all signals of the machine tool 10, such as the current value of the motor and the machine vibration signal, as shown in Step S20.

Then, the signal judgment module 30 evaluates the measured signals to judge whether or not the actual maximum current value of the servo motor 16 is equal to the manufacturer's specification, as shown in Step S30. If negative, then go to Step S40 for the acceleration optimization module 40 to modify and update the traverse acceleration ($Acc_1$), but not to modify the curve smoothing time (Ts$_1$). Then, go back to perform Step S20 for repeating the moving and measuring. After repeating several aforesaid modification loops (S30→S40→S20→S30) till the judgment of S30 is positive, then the instant traverse acceleration (Acc$_2$) would be determined as the optimal traverse acceleration (Acc).

Then, the signal judgment module 30 evaluates the measured signals to judge whether or not the actual maximum amplitude of the machining platform 50 of the machine tool 10 is equal to the target amplitude, as shown in Step S50. If negative, then go to Step 60 for the acceleration optimization module 40 to modify and update the curve smoothing time (Ts$_1$), but not to modify the traverse acceleration (Acc$_2$). Then, go to perform Step S70 for repeating the moving and measuring, and further to perform Step S50. After repeating several aforesaid modification loops (S50→S60→S70→S50) till the judgment of S50 is positive, then the instant curve smoothing time (Ts2) would be determined as the optimal curve smoothing time (Ts). Thereupon, the final group of the axial traverse acceleration (Acc) and the corresponding curve smoothing time (Ts) would be determined as the optimal traverse acceleration (Acc) and the optimal curve smoothing time (Ts), as shown in Step S80.

Figure 9:
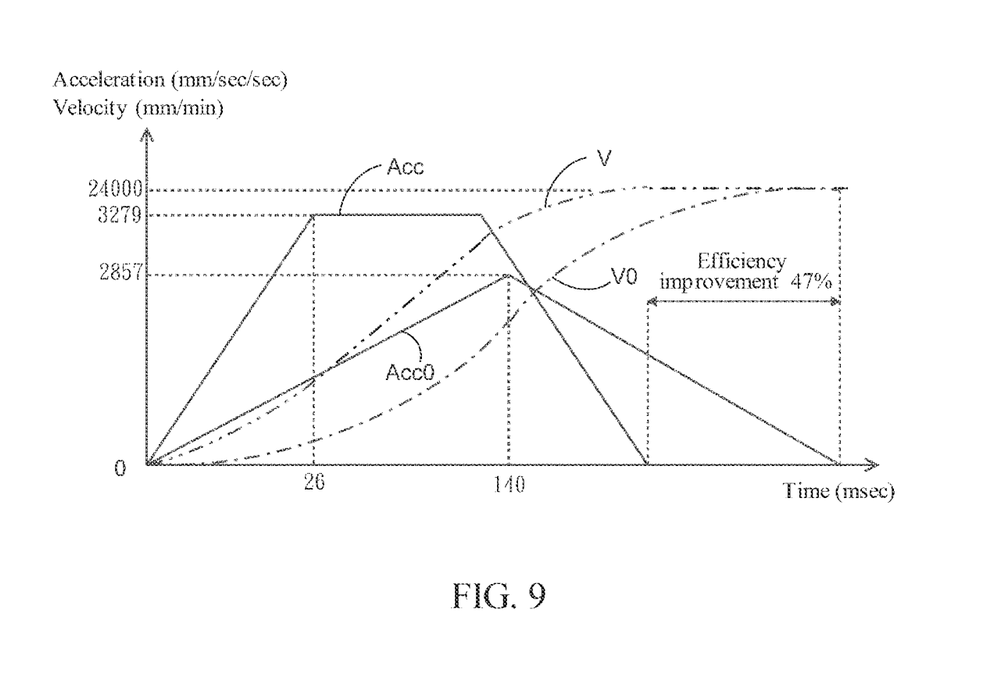
FIG. 9 shows schematically improvements by applying the system and method of this disclosure.

FIG. 9 shows schematically improvements by applying the system and method for acceleration adjustment of machine tool at rapid traverse of this disclosure. Before the method is performed, the working platform 50 is moved by a traverse stroke according to the initial setting or the manufacturer's setting. For example, the rotating speed of the servo motor 16 is set to be 2000 rpm, and the feed rate (V0) of the working platform 50 is set to be a constant of 24000 mm/min. Then, the initial traverse acceleration (Acc0) is equal to 2857 mm/sec/sec and the curve smoothing time (Ts0) is equal to 140 ms. As shown, the variations of the feed speed (V0) are presented to be an isosceles triangle, and the maximum current value (T) of the motor is about 56(%), corresponding to a torque of 38N-m. Referring back to the manufacturer's specification shown in FIG. 5 where the upper limit of the torque in the intermittent operation mode is shown to be 50N-m, it is obvious that a difference of 12N-m exists. After confirming that the position error (Err) is complied with the convergence time and the target amplitude, it implies that the initial traverse acceleration (Acc0) and curve smoothing time (Ts0) are conservative settings, and thus can be further modified and optimized.

FIG. 9 further reveals that, with the same rotating speed of the motor and the same feed rate (V), the application of the system and method of this disclosure can raise the traverse acceleration (Acc) to 3279 mm/sec/sec and shorten the curve smoothing time (Ts) to 26 ms. In particular, the variations of the traverse acceleration (Acc) are presented to be an isosceles trapezoid. The corresponding maximum current value (T) of the motor is about 73%, corresponding to a motor torque about 49N-m (i.e., 1N-m away from the upper limit of the motor). After confirming that the position error (Err) is complied with the convergence time and the target amplitude, it is found that this adjustment can increase the moving efficiency by 47%, by comparing to the manufacturer's setting.

In summary, in the system and method provided by this disclosure, the servo motor is introduced to drive the transmission mechanism, the transmission mechanism is then to move the working platform back and forth between two specific positions, and the signal measurement module is to collect all the signals related to the moving of the machining platform. The signal judgment module can automatically evaluate the signals to determine the actual maximum amplitude and actual maximum current value of the motor. The acceleration optimization module can evaluate the judgment of the signal judgment module to adjust and finally reach the optimal traverse acceleration and the corresponding curve smoothing time. Upon such an arrangement in this disclosure, the moving performance of the machining platform of the machine tool in the axial non-machining stroke can be optimized, and can meet the demands in target amplitude. Thus, the method and system provided by this disclosure are obviously patentable.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A system for adjusting an acceleration setting of a machine tool connected with a servo motor and a working platform, comprising:

a signal measurement module, configured to capture a plurality of signals generated while the servo motor of the machine tool drives the working platform from a first specific position to a second specific position, or from the second specific position back to the first specific position;

a signal judgment module, configured to evaluate the plurality of signals to determine whether an actual maximum current value of the servo motor is less than a specification value of the servo motor; and an acceleration optimization module, configured to evaluate a judgment of the signal judgment module to adjust and determine a traverse acceleration for the working platform;

wherein, when the actual maximum current value of the servo motor is less than the specification value of the servo motor, the acceleration optimization module modifies and updates the traverse acceleration, without modifying a curve smoothing time;

wherein the signal judgment module is further configured to determine a maximum position error of the working platform from a signal of a position error of the working platform captured by the signal measurement module, and subsequently deduce a variation of amplitude of the position error of the working platform with respect to time in order to determine whether a resultant actual maximum oscillation amplitude of the working platform converges to a target oscillation amplitude set by a user;

wherein, when the actual maximum oscillation amplitude is larger than the target oscillation amplitude, the acceleration optimization module elongates the curve smoothing time of a next stage;

wherein, when the actual maximum oscillation amplitude is smaller than the target oscillation amplitude, the acceleration optimization module reduces the curve smoothing time of the next stage until the target oscillation amplitude is reached;

wherein, when the actual maximum oscillation amplitude is equal to the target oscillation amplitude, the acceleration optimization module determines a final group of an optimal traverse acceleration and an optimal curve smoothing time of the next stage as the traverse acceleration and the curve smoothing time.

2. A method for acceleration adjustment of a machine tool in a non-machining traverse stroke by obtaining a traverse acceleration and a curve smoothing time, applied to the machine tool connected with a servo motor and a working platform, comprising the steps of:
- (a) applying a signal measurement module to capture a plurality of signals generated while the servo motor of the machine tool drives the working platform from a first specific position to a second specific position, or from the second specific position back to the first specific position;
- (b) applying a signal judgment module to evaluate the plurality of signals to determine whether an actual maximum current value of the servo motor is equal to a specification value of the servo motor;
- (c) applying an acceleration optimization module to adjust and determine the traverse acceleration for the working platform, based on a judgment of the signal judgment module, until the actual maximum current value is equal to the specification value of the servo motor, wherein the acceleration optimization module modifies and updates the traverse acceleration without modifying the curve smoothing time;
- (d) applying the signal judgment module to determine a maximum position error of the working platform from a signal of a position error of the working platform captured by the signal measurement module, and subsequently deduce a variation of amplitude of the position error of the working platform with respect to time in order to determine whether a resultant actual oscillation amplitude of the working platform converges to a target oscillation amplitude set by a user; and
- (e) applying the acceleration optimization module to adjust the curve smoothing time for a next stage until the actual oscillation maximum amplitude is equal to the target oscillation amplitude;

wherein the acceleration optimization module elongates the curve smoothing time for the next stage when the actual maximum oscillation amplitude is larger than the target oscillation amplitude; and wherein the acceleration optimization module reduces the curve smoothing time for the next stage when the actual maximum oscillation amplitude is smaller than the target oscillation amplitude.

* * * * *